Sept. 11, 1956  R. M. MOLTER ET AL  2,762,639
JOINT CONNECTIONS FOR FRAMING SYSTEMS
Filed Jan. 7, 1953

JOINT INVENTORS:
Ralph Marcy Molter
Kenneth Julius Molter

United States Patent Office 2,762,639
Patented Sept. 11, 1956

2,762,639

JOINT CONNECTIONS FOR FRAMING SYSTEMS

Ralph Marcy Molter, New York, N. Y., and Kenneth Julius Molter, Plainfield, N. J.

Application January 7, 1953, Serial No. 330,127

2 Claims. (Cl. 287—91)

This invention relates to joint connections used in the construction of three-dimensional framing systems with a group of interchangeable and standardized framing members and connectors.

The primary object of this invention is to provide a system of framing that can be erected and dismantled easily and is adaptable for use in horizontal, vertical and angular construction.

A further object is to provide a system of framing that has esthetically pleasing lines; is free from unsightly bolts, nuts, screws or holes; and, has the appearance of being jointless when assembled.

A further object is to provide a system of framing that may be erected without tools and does not require any mechanical ability, on the part of the erector, for erection, but is strong enough to be used for permanent construction.

Other details, objects and advantages of the invention will become apparent as the following description of certain present preferred embodiments thereof proceeds.

In the accompanying drawings we have shown certain present preferred embodiments of the invention, in which:

Figures 1 and 2 show a section through a typical joint in engaged and disengaged positions. These figures are drawn in an enlarged scale in order to depict the operation of the joint more clearly.

Figure 1:
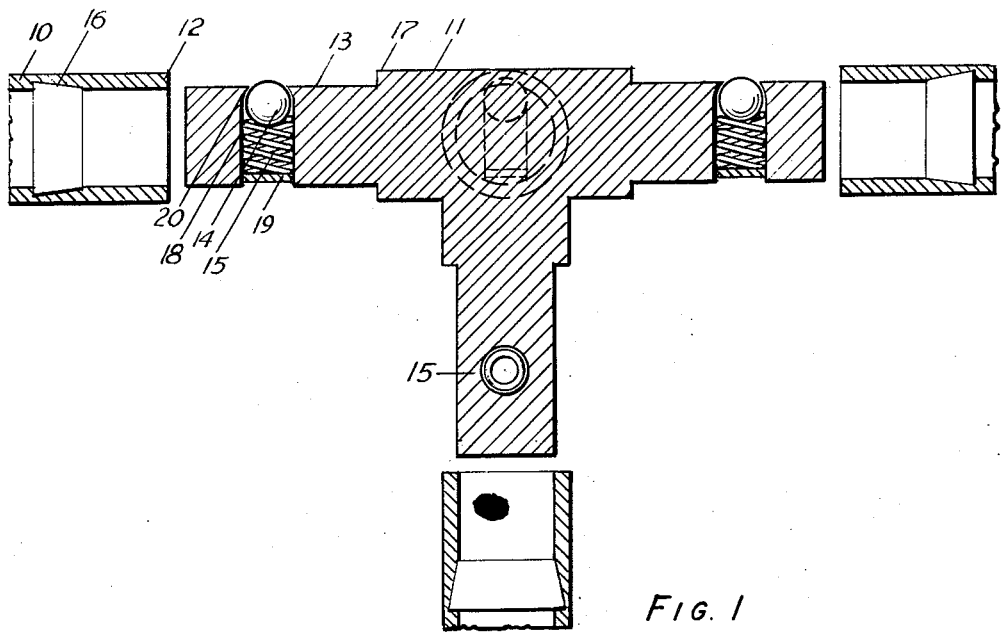
Figure 1 is a partly sectional view of the joint in a disengaged position.
Figure 2:
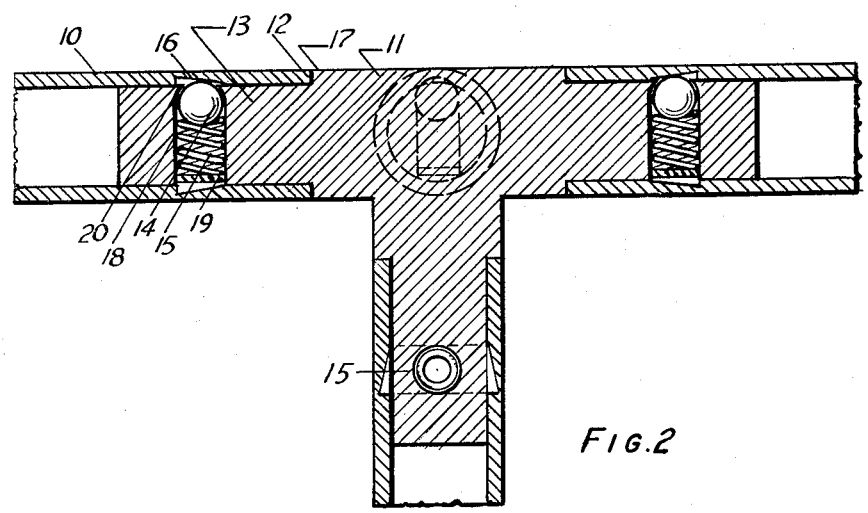
Figure 2 is a partly sectional view of the joint in an engaged position.

Referring to Fig. 1 the members of the joint are shown as they are prior to being coupled. The operation of the components of the joint is as follows.

To engage, a cooperating member-receiving end 12 of a cylindrical tube 10 is slipped over the end portion 13 of a solid cylindrical cooperating member 11. The end portion 13 has a slightly smaller cross-section than the bore of tube 10. The ball 14 is forced inwardly into the hole 18 in portion 13 thereby compressing spring 15. There is an annular recess 16 formed in the bore of tube 10 having a conical surface converging toward receiving end 12. As the ball 14 comes into contact with the annular recess 16 the spring 15 begins to decompress tending to push the ball 14 outwards and also tending to push the edge of the end 12 and the shoulder 17 of the cooperating member 11 into contact with one another. The outward force of the ball 14 exerted by the spring 15 wedges the ball into the locking position—a position which may be disengaged only by the exercise of considerable force.

To disengage, tube 10 is pulled away from member 11 forcing ball 14 inwardly into hole 18 as it progressively engages the more external portions of the recess 16. Thus end 12 may be slipped off end portion 13, whereupon ball 14 returns to its most outward position.

Ball 14 and spring 15 are held in hole 18 by lip 20 at one end of hole 18, and by a tight-fitting disc 19 at the other end. Disc 19 is inserted into hole 18 after ball 14 and spring 15 are placed in position during manufacture of member 11.

In general, framing members for any group of structural units are cut in progressive lengths dependent upon the length of the shortest member and the seat to centerline dimension of the joints. This makes it possible to substitute two or more shorter members and joints for any member, thereby providing greater flexibility in construction. Angular placement of shafts of joints and particular framing problems necessitate special lengths which can easily be made available.

It will also be realized that the joints may be used horizontally, vertically, or at any angle, and may be right or left-handed. The number and direction of the shafts is, of course, dictated by the framing problem presented.

One of the principal embodiments of this invention is the rotational feature of the locking device which permits angular distortion in constructions. This rotational feature permits either of the members of the joint to be rotated about its axis which greatly enhances the versatility of the latter.

The groove which receives the spring-urged ball detent has been tapered in order that the force of the spring transmitted through the ball will be divided into two components, one acting parallel to the major axis of the member containing the groove and thereby forcing it tightly against the seat of the other member at a joint connection.

Framing members and joints may be provided with butt ends, flanges, clips, holes and other special attachments as required by the constructions.

Framing members and joints may be manufactured in various shapes and sizes and are precision tooled so that when sections are assembled a very rigid structure is obtained. Units are inexpensive to manufacture and are interchangeable and inter-related within groups.

The possible uses of this framing system are limited only by the ingenuity and demands of the user. A few suggested ones are:

1. For framing systems for flexible constructions such as room dividers, screens, storage walls, etc.
2. For framing systems for display erections in galleries, museums, exhibition halls, etc.
3. For framing systems for display and storage erections for department stores, grocery stores and other retail outlets.
4. For framing systems for cabinets, drawer units, bookcases, shelving and other items of furniture. Clips or similar fasteners may be used to fasten wood, metal or plastic tops, sides or bottoms to the framing system.
5. For framing systems for prefabricated types of buildings such as cabins, cabanas and other shelters.
6. For educational and creative toy erections in the nursery, in the school or on the playground.

While we have shown and described certain present preferred embodiments of the invention and certain present prefererd methods and uses, it is to be distinctly understood that the same is not limited thereto but may be otherwise variously embodied and practiced within the scope of the following claims.

What is claimed is:

1. In combination, a cylindrical tube having a cooperating member-receiving end, a solid cylindrical cooperating member having at least one end portion of slightly smaller cross-section than the cross-section of the bore of said tube adjacent to said receiving end, said one end of said cylindrical member being insertable into said tube through said receiving end, the bore of said tube having a generally cylindrical surface, an annular recess formed in said bore in a region spaced inwardly from said receiving end, said recess having a conical surface converging toward said receiving end, and a spring-pressed ball detent protruding outwardly from said cylindrical member, said conical surface forming a seat for said ball detent and yieldingly urging said cylindrical member into said tube and enabling a swiveling action between said tube and said cylindrical member.

2. In combination, a cylindrical tube having a cooperating member-receiving end, a solid cylindrical cooperating member having at least one end portion of slightly smaller cross-section than the cross-section of the bore of said tube adjacent to said receiving end, a shoulder formed on said end portion at a point spaced from said smaller end of said cylindrical member, said one end of said cylindrical member being insertable into said tube through said receiving end, the bore of said tube having a generally cylindrical surface, an annular recess formed in said bore in a region spaced inwardly from said receiving end, said recess having a conical surface converging toward said receiving end, and a spring-pressed ball detent protruding outwardly from said end portion of said cylindrical member, said conical surface forming a seat for said ball detent and yieldingly urging said cylindrical member into said tube to effect abutment of the end of said tube with the shoulder of said cylindrical member and enabling swiveling action between said tube and said cylindrical member.

References Cited in the file of this patent
UNITED STATES PATENTS

| | | |
|---|---|---|
| 389,335 | Spear | Sept. 11, 1888 |
| 1,058,119 | Warner | Apr. 8, 1913 |
| 1,234,455 | Fox | July 24, 1917 |
| 1,457,964 | Doty | June 5, 1923 |
| 1,706,847 | Fisher | Mar. 29, 1929 |
| 2,341,947 | Roberts | Feb. 15, 1944 |
| 2,474,360 | Jimerson | June 28, 1949 |